United States Patent
Drabon et al.

(10) Patent No.: US 11,505,266 B2
(45) Date of Patent: Nov. 22, 2022

(54) CROSSMEMBER FOR MOTOR VEHICLE CONSTRUCTION

(71) Applicant: BENTELER AUTOMOBILTECHNIK GMBH, Paderborn (DE)

(72) Inventors: Rodscha Drabon, Salzkotten (DE); Siegmund Czerr, Bielefeld (DE); Hendrik Reineke, Bad Driburg (DE); Stefan Grottke, Rheine (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 431 days.

(21) Appl. No.: 16/660,063

(22) Filed: Oct. 22, 2019

(65) Prior Publication Data

US 2020/0130761 A1    Apr. 30, 2020

(30) Foreign Application Priority Data

Oct. 24, 2018    (DE) .......................... 102018126524.7

(51) Int. Cl.
| | |
|---|---|
| *B62D 65/04* | (2006.01) |
| *B60L 50/64* | (2019.01) |
| *B62D 21/15* | (2006.01) |
| *H01M 50/20* | (2021.01) |
| *B62D 25/20* | (2006.01) |
| *B62D 29/04* | (2006.01) |
| *B62D 21/02* | (2006.01) |
| *B62D 29/00* | (2006.01) |

(52) U.S. Cl.
CPC .............. *B62D 65/04* (2013.01); *B60L 50/64* (2019.02); *B62D 21/155* (2013.01); *H01M 50/20* (2021.01); *B62D 21/02* (2013.01); *B62D 25/20* (2013.01); *B62D 29/008* (2013.01); *B62D 29/04* (2013.01); *Y02E 60/10* (2013.01); *Y02T 10/70* (2013.01)

(58) Field of Classification Search
CPC .... B62D 65/04; B62D 21/155; B62D 29/008; B62D 29/04; B62D 25/20; B62D 21/02; B60L 50/64; H01M 50/20; Y02E 60/10; Y02T 10/70
USPC ...................................... 296/193.04
See application file for complete search history.

(56) References Cited

U.S. PATENT DOCUMENTS

| | | | |
|---|---|---|---|
| 9,748,538 B2 * | 8/2017 | Fritz ...................... | B60L 58/26 |
| 2008/0018121 A1 * | 1/2008 | Maya ..................... | B60R 19/34 |
| | | | 293/132 |

FOREIGN PATENT DOCUMENTS

| | | | | |
|---|---|---|---|---|
| DE | 102012015818 | | 2/2014 | |
| DE | 102017206988 | | 10/2018 | |
| DE | 102017206988 | A1 * | 10/2018 | ............... B60K 1/04 |

* cited by examiner

*Primary Examiner* — D Glenn Dayoan
*Assistant Examiner* — Dana D Ivey
(74) *Attorney, Agent, or Firm* — Sheridan Ross PC

(57) ABSTRACT

The invention relates to a crossmember for motor vehicle construction, having at least two modules that can be arranged one above the other, wherein each module has an inner side wall and an outer side wall, which are connected to one another at their upper ends by an upper wall and at their lower ends by a lower wall, wherein the upper wall of the lower module has, over the longitudinal extent thereof, a raised portion or depression, which engages in a complementary depression or raised portion of the lower wall of the upper module.

14 Claims, 1 Drawing Sheet

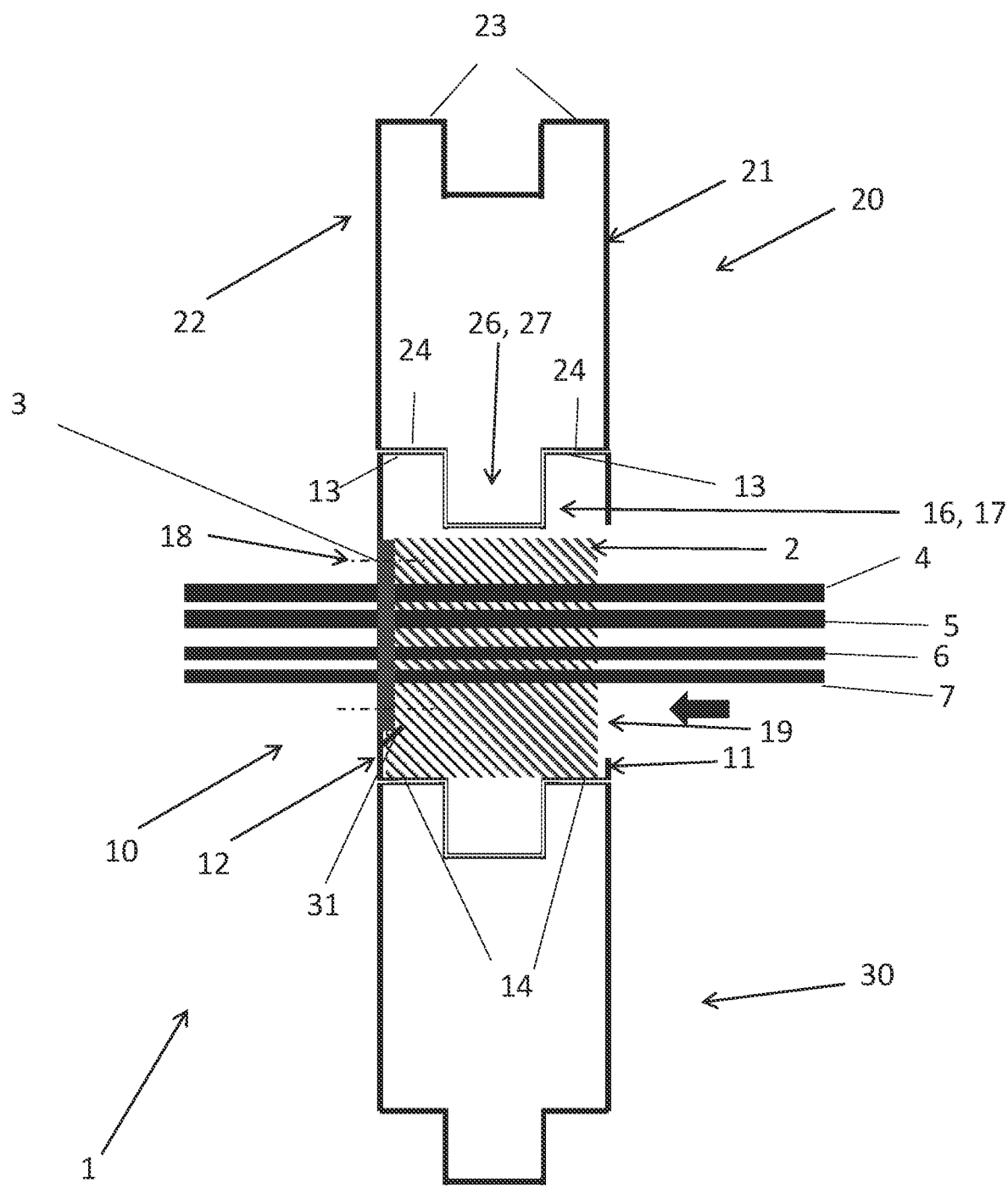

CROSSMEMBER FOR MOTOR VEHICLE CONSTRUCTION

CROSS-REFERENCE TO RELATED APPLICATION

This application claims the benefit of German Patent Application No. DE 10 2018 126 524.7 filed Oct. 24, 2018, the contents of which are incorporated herein by reference.

Field

The invention relates to a crossmember for motor vehicle construction. Crossmembers of this kind are used in many different ways in motor vehicle construction. In particular, it is known that a battery or a battery case of a motor vehicle should be provided with additional protection from the environment—including against stone impact or the like—with the aid of partition plates, wherein such partitions should additionally be inserted between a crossmember and the battery or the battery case and generally comprise a plurality of sheet-metal components. In this context, the batteries or battery cases, which are used especially on motor vehicles with exclusive or additional electric drive, are generally arranged in the floor area between longitudinal members of the motor vehicle. In order to enhance the torsional stiffness of the motor vehicle and/or of the battery case between longitudinal members of this kind, these longitudinal members are often connected or joined to crossmembers and thereby reinforced.

To partition off the battery or battery case and to enhance torsional stiffness, it is thus necessary to use a number of individual components, which must be produced separately, each with separate tools, for each individual vehicle series—including different compartment heights—depending on the height of the battery or battery case.

SUMMARY

It is therefore the object of the invention to make available a crossmember for motor vehicle construction by means of which, on the one hand, the number of components in each individual motor vehicle is minimized and, on the other hand, also a crossmember is made available which can be adapted in a simple manner to the different heights of a battery or battery case in different types of vehicle without the need to stock a large number of individual components and tools for this purpose.

This object is achieved by a crossmember for motor vehicle construction having all the features of patent claim 1. Advantageous embodiments of the invention can be found in the dependent claims.

Here, the crossmember according to the invention for motor vehicle construction has at least two modules that can be arranged one above the other, wherein each module has an inner side wall and an outer side wall. In this case, the two side walls are connected to one another at their upper ends by an upper wall and at their lower ends by a lower wall. In this arrangement, the upper wall of the lower module is provided, over the longitudinal extent thereof, with a raised portion or depression, which engages in a complementary depression or raised portion of the lower wall of the upper module.

By virtue of the configuration according to the invention of the crossmember for motor vehicle construction, it is now possible to construct a crossmember in modular fashion and thus to adapt it in height to different requirements, including, for example, in the case of different types of vehicle or even for different applications in one vehicle, wherein each crossmember is constructed from identical modular modules. The production of crossmembers is thereby optimized in a simple manner both economically and ecologically since production of this type of crossmember now only requires the use of a single tool for many different applications, even in different motor vehicle series. Moreover, the outlay on logistics is also significantly minimized since it is now only necessary to stock one type of module for the production of a very wide range of crossmembers.

According to a first advantageous embodiment of the invention, it has proven advantageous if the at least two modules that can be arranged one above the other are designed as identical extruded profiles made from a metal, in particular from aluminum or an aluminum alloy, or from a plastic. It is thereby made possible in a simple way to produce modules for the crossmember according to the invention and to make available crossmembers for a very wide range of applications with different heights, depending on how many modules are arranged one above the other. When using extruded profiles for such crossmembers, it is advantageous in particular that the length of the extruded profiles can be varied in a simple manner, while the cross section of the extruded profiles remains unchanged. It is thereby possible to produce crossmembers of different lengths with the same tool, thus enabling crossmembers for a very wide range of applications to be produced from one and the same tool, even in different motor vehicle series. To produce extruded profiles of this kind, aluminum or aluminum alloys are particularly suitable. However, the invention is not restricted to these; on the contrary, it is also possible to use other metals or metal alloys and extrude modules of this kind.

According to a particularly advantageous embodiment of the invention, it is envisaged that the raised portions are designed as tongues, which engage in the depressions, which are designed as complementary grooves. In this case, provision can be made, on the one hand, for the grooves to be arranged in the upper walls of the individual modules. However, it is also possible for the grooves to be arranged in the lower walls of the individual modules. Modules of this kind with corresponding grooves and tongues as depressions and raised portions can be connected to one another in a simple manner by appropriate insertion one into the other. It is thereby possible in a simple manner to produce different crossmembers with different heights for a very wide variety of applications in an economically and ecologically effective manner, even in different motor vehicle series. It is of course also possible, however, not only to implement raised portions and depressions in the form of grooves and tongues with the aid of the invention. Other raised portions and depressions which can be implemented by means of extrusion in corresponding modules are also included by the invention.

It has furthermore proven advantageous in this context if the individual modules are not only inserted one into the other by means of their raised portions and depressions. Although a reliable clamped joint can generally already be produced by this means, ensuring corresponding torsional stiffness, there is also provision according to the invention for these raised portions and depressions to be joined to one another. It has proven particularly expedient in this context for these raised portions and depressions to be joined by adhesive bonding, riveting or screw fastening. In principle, other joining methods are of course also possible. However, such adhesive bonding, riveting or screw fastening can be implemented in a particularly simple manner. In principle, however, it is also possible for the depressions and raised portions to be welded to one another, for example, or to be connected to one another by means of other joining methods. Common to all the joining methods, however, is the fact that there is a considerable further improvement in the torsional stiffness of the crossmember due to the modules being arranged one above the other. Particularly when adhesive bonding takes place over the entire longitudinal extent of the raised portions and depressions, there is also reliable sealing with respect to external environmental influences at the same time, with the result that the inside or inner side wall of the individual modules and thus also of the crossmember is shielded from the outside or the outer side wall of the individual modules or crossmember.

At the same time, it is of course also possible to envisage that such adhesive bonding of the individual modules of the crossmember according to the invention takes place in addition to some other joining method, e.g. riveting or screw fastening.

According to another particularly advantageous concept of the invention, it is envisaged that at least one of the modules has opposite apertures in its side walls. Apertures of this kind enable supply lines to be passed through the crossmember according to the invention. Particularly when using crossmembers that connect longitudinal members in a motor vehicle with exclusive or additional electric drive, supply lines of this kind for power, cooling, hydraulics and control are indispensable. In this case, the crossmember according to the invention is used as a partition or bulkhead for the battery case and protects the latter from external influences, e.g. stone impact or the like.

Here, at least one module of a crossmember according to the invention advantageously has such an aperture in its side walls, and therefore only one opening is required in the crossmember for the supply lines, while other members of the component having the crossmember can be formed without openings.

According to another concept of the invention, it has proven advantageous here for a molded element, preferably made of foam, to be arranged in the module, between the side walls, in the region of the apertures. The incorporation of a molded element of this kind enables the apertures in the side walls to be closed again, thus enabling the battery case to be protected or sealed off from external environmental influences when a crossmember of this kind is used, for example.

In order to ensure particularly simple handling in this case, it has proven advantageous for the aperture in the outer side wall to have a smaller cross section than the aperture in the inner side wall of the module. This makes it a simple matter to insert a corresponding molded element through the inner side wall of the module in the direction of the outer side wall of the module without the risk that the molded element will be pushed through the apertures.

In this case, the molded element abuts the outer side wall in its end position and can then be fixed in the module in an appropriate fashion between the outer side wall and the inner side wall. Here, the apertures can have different shapes, and, in particular, can be of circular, oval or rectangular or even polygonal design.

Although the use of a molded element made of foam already enables appropriate sealing to be achieved, there is provision, according to another concept of the invention, for a seal to be arranged between the outer side wall and/or the inner side wall and the molded element. This further increases or ensures the leaktightness of the crossmember or module having the apertures.

According to another concept of the invention, the molded element is provided with leadthroughs for supply lines, in particular for an energy supply, a control system, a hydraulic system, a cooling system etc. It is particularly advantageous here if all the supply lines are passed through one leadthrough, thus ensuring that the molded element need have only one leadthrough and can thus be produced more easily, more quickly and more economically. This enables all the supply lines to be passed through the molded element within the crossmember or module having the apertures. There is no need for any additional leadthroughs, and therefore a particularly stable embodiment of a crossmember is obtained by means of this single opening in the crossmember or module having the apertures. There is no need for any further leadthroughs, either in the crossmember or in any longitudinal member.

Here, the crossmember according to the invention can be used not only as a crossmember for increasing torsional stiffness. In particular, this crossmember can additionally be designed as a bulkhead, thus eliminating the need to use an additional bulkhead. The crossmember allows adequate partitioning off of the battery case from the environment. To this extent, the outlay on components is further minimized, and the production of a crossmember which is additionally also designed as a bulkhead allows ecologically and economically effective production.

Further aims, advantages, features and possible uses of the present invention will emerge from the following description of an illustrative embodiment with reference to the drawing. In this context, all the features described and/or depicted, in themselves or in any feasible combination, form the subject matter of the present invention, even when considered independently of their combination in the claims or the dependency references thereof.

BRIEF DESCRIPTION OF THE DRAWINGS

In the drawings:

FIG. 1: shows a crossmember according to the invention in a cross-sectional illustration.

DETAILED DESCRIPTION

In FIG. 1, then, a crossmember 1 according to the invention can be seen in a cross-sectional illustration. Here, the crossmember 1 consists of three modules 10, 20 and 30 arranged one above the other, wherein the two upper modules 10 and 20 are described in greater detail below. In this context, the module 30 does not have to be part of the crossmember 1; on the contrary, it can also be designed as part of a base, to which the crossmember 1 is joined in a leaktight manner, e.g. welded in a fluidtight manner, in the case of a base for a battery or a battery case, for example.

In this case, the two modules 10 and 20 are designed as extruded aluminum hollow profiles, wherein the upper module 20 has an outer side wall 22, an inner side wall 21 as well as an upper wall 23 and a lower wall 24.

The lower module 10 likewise has an outer side wall 12, an inner side wall 11 as well as an upper wall 13 and a lower wall 14. With the exception of apertures 18 and 19 in the outer and inner side walls 12, 11 of the lower module, wherein these apertures 18 and 19 do not extend over the entire longitudinal extent of the module 10 but are designed as windows, the upper module 20 and the lower module 10 are of identical design. In particular, both modules 10, 20 can be produced in the same extruding tool, wherein the apertures 18, 19 are introduced subsequently into the side walls 11, 12 of the module 10, e.g. by cutting out. Of course, it is also possible to introduce the apertures 18, 19 after joining. In particular, it is then possible in a simple manner for apertures 18, 19 which also extend over two or more modules to be obtained.

In this case, an aperture 16 in the form of a groove 17 is formed in the upper wall 14 of the lower module 10. A raised portion 26, designed as a tongue 27, of the lower wall 24 of the upper module 20 engages in this groove 17. Thus, the two modules 10 and 20 are connected to one another in a torsion-resistant manner via this groove 17 and tongue 27 or the connection thereof. This connection can be additionally strengthened by joining by means of screw fastening, adhesive bonding, riveting or the like in addition.

A depression in the form of a groove, into which an additional module having a corresponding tongue can be inserted, is now likewise machined into the upper wall 23 of the upper module 20. Thus, the crossmember is of variable design in its height. The height is determined by the number of individual modules.

In order to minimize the number of individual leadthroughs for a very wide variety of supply lines, one aperture 18 is provided in the outer wall 12 of the module 10 and one aperture 19 is provided on the opposite side in the inner wall 11 thereof. Here, the cross section of aperture 19 is larger than the cross section of aperture 18, thus enabling a corresponding molding 12 made from a foam to be pushed easily through the aperture 19 in the inner wall 11 until the molded element 2 abuts the outer wall 12 of the module 10 in the interior of the latter. In the illustrative embodiment under consideration, an additional seal 12, which additionally seals off the crossmember 1 from the environment, is arranged between the outer wall 12 of the module 10 and the molded element. Leadthroughs for supply lines 4, 5, 6 and 7, in particular for an energy supply, a control system, a hydraulic system and a cooling system, are provided within the molded element 2, which is composed of a foam. In this case, all the supply lines are passed exclusively through the molded element 2 within the module 10. When a crossmember 1 of this kind is used as partitioning for a battery case, the openings for leadthroughs of supply lines can thus be minimized, and hence the stability and torsional stiffness of the entire motor vehicle can be increased.

In addition to the use of the crossmember 1 as a connecting element between two longitudinal members, the crossmember 1 also serves as a bulkhead in order to protect the battery case or battery holder from external influences, in particular from contamination and moisture.

In this case, the seal 3 between the molded element 2 and the outer side wall 12 of the lower module 10 is designed as a sealing frame which is supported on an edge 31 on the inside of the outer side wall 12 of the module 10. Slipping of the seal is thus also prevented in an effective manner.

LIST OF REFERENCE SIGNS 1 crossmember
2 supply line
3 supply line
4 supply line
5 supply line
10 module
11 inner side wall
12 outer side wall
13 lower wall
14 upper wall
16 depression
17 groove
20 module
21 inner side wall
22 outer side wall
23 lower wall
24 upper wall
26 raised portion
27 tongue
30 module
31 edge

What is claimed is:

1. A crossmember for motor vehicle construction, comprising at least two modules that can be arranged with an upper module disposed above a lower module, wherein each module has an inner side wall and an outer side wall, which are connected to one another at upper ends by an upper wall and at lower ends by a lower wall-, wherein the upper wall of the lower module has, over a longitudinal extent thereof, a raised portion or depression, which engages in a complementary depression or raised portion of the lower wall of the upper module, and wherein the at least two modules are designed as identical extruded profiles made from a metal or from plastic.

2. The crossmember of claim 1, wherein the at least two modules are made from aluminum or an aluminum alloy.

3. The crossmember of claim 1, wherein the raised portions are designed as tongues, which engage in the depressions, which are designed as complementary grooves.

4. The crossmember of claim 1, wherein raised portions are joined to the depressions.

5. The crossmember of claim 4, wherein the raised portions are adhesively bonded, riveted, or screwed to the depressions.

6. The crossmember of claim 1, wherein at least one of the upper modules or the lower module has opposite apertures in the inner side wall and the outer side wall.

7. The crossmember of claim 6, wherein the aperture in the outer side wall has a smaller cross section than the aperture in the inner side wall.

8. The crossmember of claim 6, wherein a molded element is arranged in the upper module or the lower module between the side walls and in a region of the apertures.

9. The crossmember of claim 8, wherein the molded element includes leadthroughs for supply lines.

10. The crossmember of claim 9, wherein the supply lines are for an energy supply, a control system, a hydraulic system, or a cooling system.

11. The crossmember of claim 8, wherein a seal is arranged between at least one of the outer side wall or the inner side wall and the molded element.

12. The crossmember of claim 8, wherein the molded element is made of foam.

13. The crossmember of claim 1, wherein the crossmember is designed as a bulkhead.

14. A bulkhead comprising the crossmember of claim 1.

* * * * *